United States Patent [19]

Fisher

[11] Patent Number: 5,828,679
[45] Date of Patent: Oct. 27, 1998

[54] OPTICAL CLOCK SIGNAL EXTRACTION USING NON-LINEAR OPTICAL MODULATOR

[75] Inventor: Michael Andreja Fisher, Suffolk, United Kingdom

[73] Assignee: British Telecommunications public limited company, London, England

[21] Appl. No.: 899,124

[22] Filed: Jul. 23, 1997

Related U.S. Application Data

[62] Division of Ser. No. 397,203, Mar. 28, 1995, Pat. No. 5,673,140.

[30] Foreign Application Priority Data

Sep. 8, 1992 [EP] European Pat. Off. ............. 92308104

[51] Int. Cl.$^6$ .................................................. H01S 3/07
[52] U.S. Cl. .............................. 372/6; 359/158; 359/341; 372/18; 372/25; 372/26
[58] Field of Search .................................. 372/6, 18, 25, 372/26, 28, 29, 30, 32, 33, 38; 359/158, 326–332, 340, 341, 346

[56] References Cited

U.S. PATENT DOCUMENTS

| | | | |
|---|---|---|---|
| 4,528,464 | 7/1985 | Chemla et al. | 359/326 |
| 5,050,483 | 9/1991 | Duling, III | 372/94 |
| 5,311,525 | 5/1994 | Pantell et al. | 372/6 |
| 5,386,311 | 1/1995 | Shields | 372/38 X |
| 5,434,700 | 7/1995 | Yoo | 359/332 |
| 5,548,433 | 8/1996 | Smith | 372/32 X |
| 5,602,862 | 2/1997 | Barnsley et al. | 372/45 |
| 5,673,140 | 9/1997 | Fisher | 359/332 |

FOREIGN PATENT DOCUMENTS

| | | |
|---|---|---|
| 0456422 | 11/1991 | European Pat. Off. . |
| 60-108818 | 6/1985 | Japan . |

OTHER PUBLICATIONS

Barnsley et al, "Clock Extraction Using Saturable Absorption in a Semiconductor Nonlinear Optical Amplifier", IEEE Photonics Technology Letters, vol. 3, No. 9, Sep. 1991, pp. 832–834.
Patent Abstracts of Japan, vol. 9, No. 259 (P–397) 17 Oct. 1985 & JP,A,60–108,818 (Matsushita), 14 Jun. 1985.
Fisher et al, "Ultrafast Nonlinear Refraction in an Active MQW Waveguide", Electronics Letters, vol. 29, No. 13, Jun. 1993, Stevenage GB, pp. 1185–1186.
Grant et al, "Observation of Ultrafast Nonlinear Refraction in an InGaAsP Optical Amplifier", Applied Physics Letters, vol. 58, No. 11, Mar. 1991, New York US, pp. 1119–1121.
Cavailles et al, "Very Low Power Nonlinear Directional Coupling in a p–i(MQW)–n Vertical Coupler Using an Electrooptic Feedback", IEEE Photonics Technology Letters, vol. 2, No. 5, May 1990, New York US, pp. 343–345.
Patent Abstracts of Japan, vol. 16, No. 345 (P–1392) 27 Jul. 1992 & JP,A,04 104 130 (Hitachi) 6 Apr. 1992.

(List continued on next page.)

*Primary Examiner*—John D. Lee
*Attorney, Agent, or Firm*—Nixon & Vandehrye P.C.

[57] ABSTRACT

A non-linear semiconductor optical device includes an active waveguide with a multiple quantum well construction in the active region. The device is supplied with a drive current at the material transparency current with respect to an optical pump. An optical non-linearity appears with respect to input radiation having a wavelength below that of the bandgap equivalent wavelength of the active region ($\lambda < \lambda_g$), the effect being achieved at relatively low optical input powers. The non-linearity is fast enough that a switching device incorporating the invention, in use as a demultiplexer, has potential to be used at bit rates approaching the Tbit/s range. In a demultiplexer embodiment, the non-linearity may be exploited in a directional coupler, an optical pump being used intermittently to control cross-over of an incoming TDM data signal so as to "pick off" a selected channel. Other applications include optical logic devices.

18 Claims, 4 Drawing Sheets

OTHER PUBLICATIONS

Eiselt, "Optical Loop Mirror With Semiconductor Laser Amplifier", Electronics Letters, UK, vol. 28, No. 16, Jul. 1992, pp. 1505–1507 XP000309696.

Stegeman et al, "Third Order Non–Linear Integrated Optics", Journal of Lightwave Technology, vol. 6, Jun. 1988, pp. 953–970.

Hultgren et al, "Ultrafast Refractive Index Dynamics in AlGaAs Diode Laser Amplifiers", Applied Physics Letters, vol. 59, pp. 635–637, 1991 (Aug.).

Vu Van Lu'C et al, "Electrical Diagnostics of the Amplifier Operation and a Feasibility of Signal Registration on the Basis of the Voltage Saturation Effect in Junction Laser Diodes", IEEE Journal of Quantum Electronics, QE19, pp. 1080–1083, 1983 (Jun.).

LaGasse et al, "Femto Second Measurements of the Non–Resonant Non–Linear Index in AlGaAs", Applied Physics Letters, vol. 56, pp. 417–419, 1990 (Jan.).

Mizrahi et al, "Two Photon Absorption as a Limit to All–Optical Switching", Optics Letters, vol. 14, pp. 1140–1142, 1989 (Oct.).

Sheik–Bahae et al, "Dispersion of Bound Electronic Non–Linear Refraction in Solids", IEEE Journal of Quantum Electronics, vol. 27, pp. 1296–1309, 1991 (Jun.).

Tsang et al, "Two–Photon Absorption and Self–Phase Modulation in InGaAsP/InP Multi–Quantum–Well Waveguides", Journal of Applied Physics, vol. 70, pp. 3992–3994, 1991 (Oct.).

Davies et al, "Integrated Lossless 1 to 4 Optical Splitter/Combiner Operating at $1.55 \mu m$", Post Deadline Paper (PD10) at Topical Meeting on Optical Amplifiers and Applications, Santa Fe, New Mexico, Jun. 24–26, 1992.

Cooper et al, "High–Power $1.5 \mu m$ All–Movpe Buried Heterostructure Graded Index Separate Confinement Multiple Qauntum Well Lasers", Electronics Letters, vol. 25, pp. 1635–1636, Nov. 1989.

Seltzer et al, "Zero–Net–Strain and Conventionally Strained InGaAsP/InP Multiquantum Well Lasers", Electronics Letters, vol. 28, pp. 63–65, 1992 (Jan.).

O'Neill et al, "All–Optical Loop Mirror Switch Employing an Asymmetric Amplifier/Attenuation Combination", Electronics Letters, 1990, vol. 26, pp. 2008–2009, Nov. 1990.

Smith et al, "All–Optical Clock Recovery using A Mode–Locked Laser", Electronics Letters, vol. 28, No. 19, pp. 1814–1816, 1992 (Sep.).

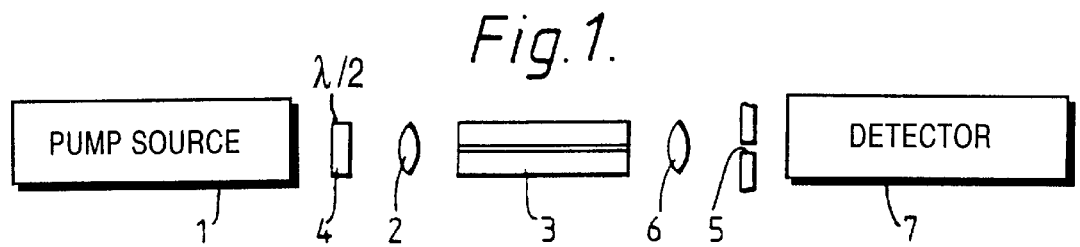
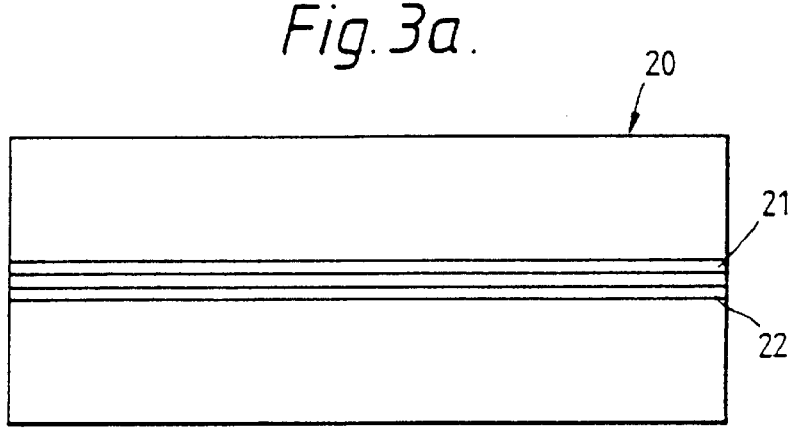
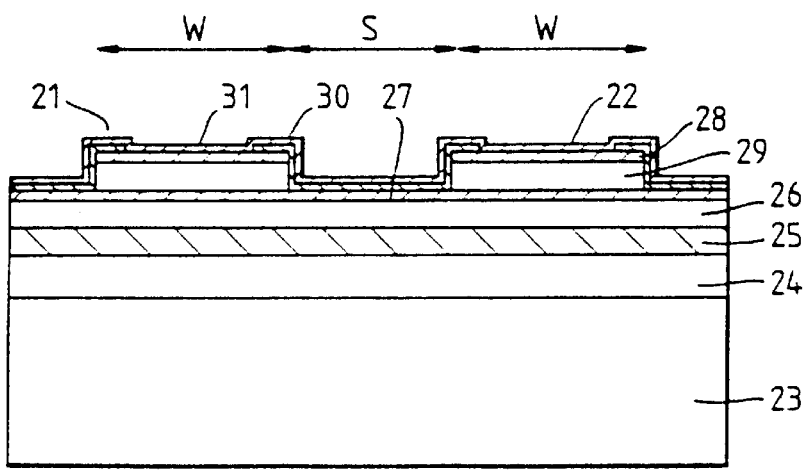

OPTICAL CLOCK SIGNAL EXTRACTION USING NON-LINEAR OPTICAL MODULATOR

RELATED APPLICATION

This is a divisional of application Ser. No. 08/397,203, filed, Mar. 28, 1995 (now U.S. Pat. No. 5,673,140).

BACKGROUND OF THE INVENTION

1. Field of the Invention

The present invention relates to a non-linear semiconductor optical device. Such devices find application in optical communications systems, for instance as switches.

Embodiments of the present invention can show a relatively large and fast optical non-linearity and thus lend themselves to exploitation for instance in high speed or high data rate optical communication systems.

2. Related Art

Communications links which can carry high data rates are advantageous because they can transmit increased levels of information and/or can provide links via a single physical connection which services higher numbers of customers. For instance, time division multiplexed signals on a communications link can provide a higher number of time slots, and potentially therefore service a higher number of customers, where the link itself carries a higher data rate. Alternatively, ultra high bit rate links may enable customers to be offered large bandwidth services, and/or give telecommunications companies greater flexibility in managing their networks.

In order to access the data on a communications link, it is necessary to download the information on the link to a receiver. To do this, switching devices may be used, the speed of switching of the device being commensurate with the capability of the link for carrying high speed traffic. In optical communications, it is envisaged that data rates may be achieved as high as 100 Gbit/s or more, in the foreseeable future. This might be carried for instance in ten time slots, providing ten channels at 10 Gbit/s.

Data rates of 100 Gbit/s or higher will require all-optical switching elements since electronic components operating at such speeds are not available. Embodiments of the present invention can provide an important part of achieving ultra high bit rate links, providing a switching device potentially capable of demultiplexing for instance a 10 Gbit/s bit stream from a 100 Gbit/s optical time division multiplexed (OTDM) signal. An optical pump synchronised to the data stream might be used to switch out every tenth bit.

Applications of a large, fast optical non-linearity such as that provided by embodiments of the present invention go beyond just high data rate optical communication systems. In particular, there will be applications in all-optical processing and logic systems. A reference in this respect is a review paper: "Third Order Non-Linear Integrated Optics" by G I Stegeman et al., Journal of Lightwave Technology, vol 6 953–970 June 1988. This describes a range of devices and applications, many of which could be exploited using embodiments of the present invention.

A further desirable characteristic in an optical switching device is the combination of high speed of operation with moderate optical power requirements for switching, preferably the optical switching power being generated from a conventional source for optical transmission.

Recently, a large above-bandgap ultrafast optical non-linearity has been observed in active waveguides driven at the material transparency current. The above-bandgap non-linearity is reported in two papers, as follows: "Observations of Ultrafast Non-Linear Refraction in an InGaAsP Optical Amplifier", published in Applied Physics Letters volume 58 pages 1119–1121 (1991) by R S Grant and W Sibbett, and "Ultrafast Refractive Index Dynamics in AlGaAs Diode Laser Amplifiers", published in Applied Physics Letters volume 59 page 635 (1991) by C T Hultgren and E P Ippen.

In an active waveguide as discussed herein, there is an optically confined active region of material which can be supplied in use with a drive current to produce gain by stimulated emission in optical radiation propagating through the active region. In the absence of electrical injection by means of the drive current, this active region leads to interband absorption of light for wavelengths shorter than the bandgap equivalent wavelength. The structure is designed such that current injection produces electron/hole populations in the active region, countering the interband or stimulated absorption with the stimulated emission to a degree determined at least in part by the drive current, over a range of wavelengths corresponding to the gain bandwidth, between the bandgap equivalent wavelength and some shorter wavelength. For a given wavelength there is then a "material transparency current" being the level of current injection at which stimulated emission and stimulated absorption are balanced and there is no net change in the carrier populations induced by the presence of the input optical pump. It should be noted that stimulated absorption does not include absorption by processes other than interband transitions, eg. it does not include defect related losses, free carrier absorption or scattered light. The material transparency current is a function of wavelength; while a transparency current can be found for any wavelength in the gain bandwidth, for a given device, the value of this current will depend on the particular wavelength considered. In practice the short wavelength limit will be determined by the maximum current that can be applied to a particular device, since higher currents are required to achieve material transparency at shorter wavelengths.

The term "above-bandgap" is used herein to indicate a system in which the photon energy of optical radiation used to trigger the non-linearity is greater than the bandgap energy of an active region in the device through which the radiation propagates.

The non-linearity is potentially very attractive for all-optical switching and processing devices operating at bit rates approaching the Tbit/s range. These devices could work at switching powers considerably lower than those required by devices using known alternative ultrafast effects such as the below bandgap optical Stark effect.

The origin of the new, above-bandgap non-linearity is not yet clear. Dynamic carrier effects may contribute, as may a resonantly enhanced optical Stark effect, not normally observable in passive waveguides because of high interband absorption. In the case of active waveguides at transparency, this optical loss is balanced by gain from the electrical pumping.

SUMMARY OF THE INVENTION

An object of the present invention is to provide a non-linear semiconductor optical device, such as a switch, which can offer the combination of a high speed of operation with moderate optical power requirements.

According to a first aspect of the present invention, there is provided a non-linear, active, optical semiconductor device for use in data operations in optical communications systems, the device comprising i) an active region adapted to receive an optical signal;
ii) optical pump input means for inputting an optical pump to said active region, said optical pump comprising a wavelength shorter than a bandgap equivalent wavelength of said active region; and
iii) optical gain determining means for setting said active region at, or substantially at, transparency with respect to the optical pump, such that stimulated emission and stimulated absorption are substantially balanced at the wavelength of the optical pump radiation, the arrangement being such that, in use, the optical pump affects the refractive index of said active region in a non-linear fashion such that transmission of the optical signal in the device can be controlled.

It has been found, in connection with the present invention, that there appears to be a significant enhancement of the non-linear effect in quantum well devices rather than bulk material devices. (That is, as will be understood by a person skilled in this art, where the active region of a device has a quantum well structure.) A relatively large non-linear figure of merit has been demonstrated, indicating considerable promise for practical ultrafast switching systems. In particular, phase shifts of 5π/2 radians in a 1 mm long device at 820 mW peak optical power have been observed in non-optimised devices, which phase shifts were effectively instantaneous on a 20 ps time scale.

Where the active region comprises a quantum well rather than bulk structure, there will be a significant enhancement of the non-linear effect, allowing use of lower pump powers for instance. Furthermore it has been found that if the quantum well material is "strained", for example by incorporating a lattice mis-match between successive material layers, the non-linear effect is further enhanced.

The active region may be part of a waveguide arrangement. The waveguide arrangement may then comprise a ridge or buried heterostructure waveguide and comprise semiconductor materials suitable for integration with other devices in a semiconductor based optical communications system, such as the indium phosphide based materials.

According to a second aspect of the present invention, there is provided a method of operating an active optical semiconductor device, the method comprising the steps of:

1) inputting an optical signal to the active region of the device;
2) inputting an optical pump, at a wavelength shorter than the bandgap equivalent wavelength of the active region, to the active region;
3) adjusting the optical gain of the active region such that stimulated emission and stimulated absorption, at the wavelength of the optical pump, are substantially equal; and
4) controlling the transmission of the optical signal through the device by utilising the optical pump to affect the refractive index of the active region of the device.

Advantageously, the optical signal may be chosen to have a wavelength for which the material is not at transparency, ie. the pump and signal wavelengths may be distinct. This allows a device to be operated in a regime where the signal experiences gain, for example at wavelengths longer than the pump. Signal wavelengths in the bandgap can also be employed. The selection of an optimum signal wavelength will depend on a balance between the insertion loss of a particular device and the size of the available non-linearity under cross phase modulation conditions. This will depend on the detuning between the pump and signal wavelengths.

Additionally, any dependence on the relationship between the pump wavelength and the bandgap equivalent wavelength should be taken into account. Preferably a region of operation is thus chosen with a large non-linearity where the signal wavelength experiences gain or at least low loss.

It will clearly be necessary in any embodiment of the present invention that the optical pump has a wavelength for which a transparency current can be set. This will lie to the short wavelength side of a (or the) bandgap equivalent wavelength for the active region, for instance within a few tens of nm of said bandgap equivalent wavelength.

BRIEF DESCRIPTION OF THE DRAWINGS

Embodiments of the invention will now be described in more detail, by way of example only, with reference to the accompanying figures, in which;

FIG. 1 shows a block diagram of an experimental arrangement for demonstrating use of a switching device according to an embodiment of the present invention;

FIGS. 3a and 3b show a plan view and cross section respectively of a directional coupler device structure using the non-linear effect demonstrated in the experimental arrangement of FIGS. 1 and 2;

DETAILED DESCRIPTION OF EXEMPLARY EMBODIMENTS

Figure 2A:
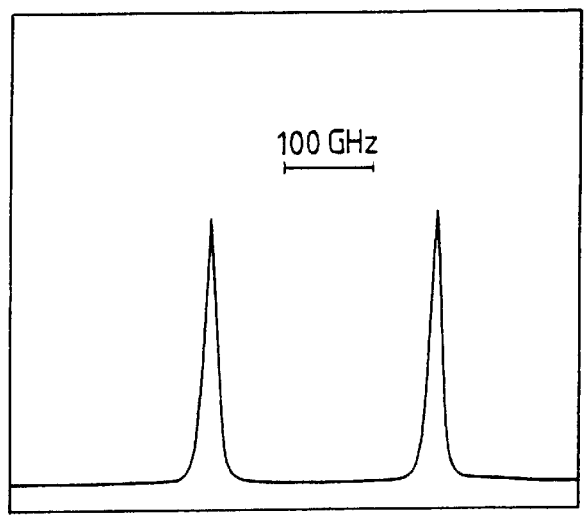
FIGS. 2a, 2b and 2c show spectra for pulses passing through active buried heterostructure waveguide devices according to embodiments of the present invention, in TE polarisation.

Referring to FIG. 1, an experimental arrangement for demonstrating non-linear behaviour of an active waveguide 3 comprises a pulse source 1, coupled via a half wave plate 4 and an input objective 2 to the active waveguide 3 whose characteristics are being demonstrated. The output of the waveguide 3 is collected by an output objective 6 and spatially filtered by means of a small aperture 5 before detection at a detector 7.

It should be noted that the function of the half wave plate 4 can be provided in other ways and it might for instance be regarded as part of the source 1.

Non-linear behaviour in the waveguide 3 can be characterised by observing self phase modulation (SPM) of a short, high power optical pulse on passing through the waveguide 3 under conditions of carrier injection. The pulses used are of 20 to 30 ps length, provided by a pulse source 1 comprising a synchronously mode-locked KCl: Tl⁰ (1) colour-centre laser operating at 82 MHz, configured to give stable, transform limited pulses, monitored using an auto-correlator. The objectives 2, 6 for coupling light into and out of the active waveguide 3, comprise microscope objectives and the half wave plate 4 controls the launched polarisation of the input pulses. The aperture 5 is dimensioned to pass only light in the guided mode in the waveguide 3 for detection at the detector 7.

The power of the light in the guided mode can be assessed by measuring the power collected behind the aperture 5 and relating this back to power in the waveguide 3 using a calibration of the aperture 5 from measurements of spontaneous emission from the waveguide 3. This calibration is consistent with estimates of the out-coupling efficiency of the microscope objective 6 used.

The optical wavelength of the colour-centre laser used at the pulse source 1 (tunable in the 1.5 $\mu$m range) was set to lie within the gain spectrum of the waveguide 3. SPM behaviour was seen to be similar across this range, with appropriate setting of the transparency current. A single device should, therefore, be able to operate at any point across a broad wavelength range (tens of nm) with an appropriate current bias.

A scanning Fabry-Perot interferometer was used to monitor the spectrum of the transmitted light from the waveguide 3 and an infra-red vidicon used to observe the near field patterns.

Measurements were performed at the material transparency current. This can be identified by monitoring the voltage supplied to the waveguide 3 by a constant current source (not shown) in the presence of a modulated optical signal, as disclosed in the publication "Electrical Diagnostics of the Amplifier Operation and a Feasibility of Signal Registration on the Basis of the Voltage Saturation Effect in Junction Laser Diodes" published IEEE Journal of Quantum Electronics volume QE19 pages 1080–1083 (1983), by Vu Van Lu'c, Eliseev, P G, Manko, M A and Mikaelian G T. The modulated optical signal could alternatively be replaced by pump radiation. Away from transparency, a voltage modulation is observed, either in phase or in anti-phase with the launched optical modulation. At transparency the amplitude of modulation goes through zero as the incident light does not then affect the carrier population in the waveguide. This is a convenient way of setting the material transparency current and may provide the basis for an automatic control scheme.

Transparency set as described at high or low optical powers may be different. In practice, the current set should minimise any long term carrier accumulation or depletion effects.

Results using the above arrangement, either above or below the transparency current, showed spectral broadening of the output pulse due to saturation of either the gain or absorption respectively in the waveguide 3. This broadening was accompanied by a shift of the whole spectrum.

Figure 2B:
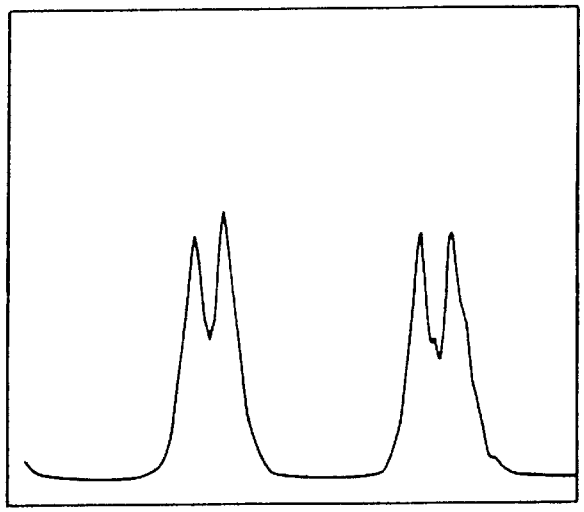
Figure 2C:
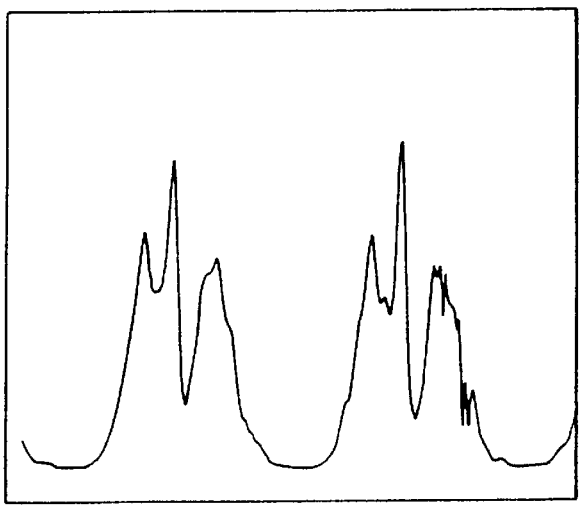

Referring to FIGS. 2a, 2b and 2c, at transparency however, symmetrical broadening with no shift in centre wavelength was observed with a change in the shape of the spectrum. The transparency current was 12.6 mA at 15.0° C., the transmitted wavelength being 1526.8 nm. The two peaks in FIG. 2a correspond to a single wavelength and come from adjacent free spectral ranges of the spectrometer.

The overall refractive index n of a material or structure can be affected by various factors. One of these is the intensity I of optical radiation in the material or structure. The refractive index n can for instance be considered to be the sum of a "base" refractive index, $n_0$, and a component dependent on the intensity of optical radiation present, $n_2 I$. This introduces the non-linear refractive index coefficient $n_2$ which is constant at lower optical intensities but may become intensity dependent at higher optical intensities.

The spectral behaviour seen in FIGS. 2a, 2b and 2c, similar to that observed and published by Grant and Sibbett in the paper referenced above, is characteristic of SPM due to a non-linear index change with a recovery time much faster than the incident pulse duration, the latter being 21 ps, assuming a Gaussian pulse shape. The shapes of the spectra allow the peak phase shift in the waveguide to be determined. The spectra in FIGS. 2b and 2c correspond to peak phase shifts of $3\pi/2$ and $5\pi/2$ radians respectively. This allows assessment of the magnitude of the non-linear refractive index coefficient $n_2$.

The guided power, taken as the power emerging from the waveguide 3, was determined as described above, maximum peak power used being 820 mW, and the modal area calculated using the weighted index method modified for buried heterostructure waveguides. This gave a value of 2 $\mu m^2$ for TE polarisation. Values for $|n_2|$ of $4\times 10^{-11}$ cm$^2$ W$^{-1}$ for TE and $2.5\times 10^{-11}$ cm$^2$ W$^{-1}$ for TM were obtained, similar to but somewhat larger than previously reported values. The error was $\pm \sim 1\times 10^{-11}$ cm$^2$ W$^{-1}$.

It should be noted that the values determined are for the waveguide 3 rather than for the non-linear material, the optical confinement factor being approximately 0.04 in the waveguide structure used. There is thus considerable scope for optimising the structure to give larger $n_2$ values if desired.

Earlier work indicates that the non-linearity is negative, this being referred to in the papers by Grant et al and Hultgren et al referenced above, and the values determined for $n_2$ may be compared with values of $\sim 1\times 10^{-12}$ cm$^2$ W$^{-1}$ for the below bandgap optical Stark effect, as disclosed in "Femto Second Measurements of the Non-resonant Non-Linear Index in AlGaAs", published in Applied Physics Letters volume 56 pages 417–419 (1990) by M J La Gasse et al.

Other materials considered for picosecond all-optical switching include glass fibres and organics. Silica fibre has an $n_2$ value of $\sim 3\times 10^{-16}$ cm$^2$ W$^{-1}$ and therefore much longer devices are required to achieve significant phase shifts. Organic materials can in principle exhibit comparable values of $n_2$ to transparent semiconductor waveguides, but the materials are poorly developed for device applications with serious problems of optical loss, stability and device processing. Active semiconductor waveguides therefore offer considerable advantages for compact devices based on a mature materials and process technology, including the possibility of integration with a range of optoelectronic components.

As far as speed is concerned, preliminary measurements indicate recovery times considerably faster than 20 ps but say no more than that. The earlier work published by Grant et al in the paper referenced above suggests a value of a few ps but recent time resolved work, described in the paper by Hultgren et al referenced above, has demonstrated a large (negative) component faster than the 400 fs pulses used in their experiments as well as a (positive) slower one (~1.7 ps) associated with carrier heating. It can be speculated that the spectral data put forward in the paper by Grant et al referenced above is affected by this slower component.

In order to explicit a non-linear refractive index for switching, the phase shift produced may be converted to a more usable form. For example, in a Mach-Zehnder interferometer, the signal amplitude can be split into two branches and a non-linear phase shift imposed on one branch. When the two branches are recombined, interference can convert the phase change into a signal amplitude change.

Figure 4:
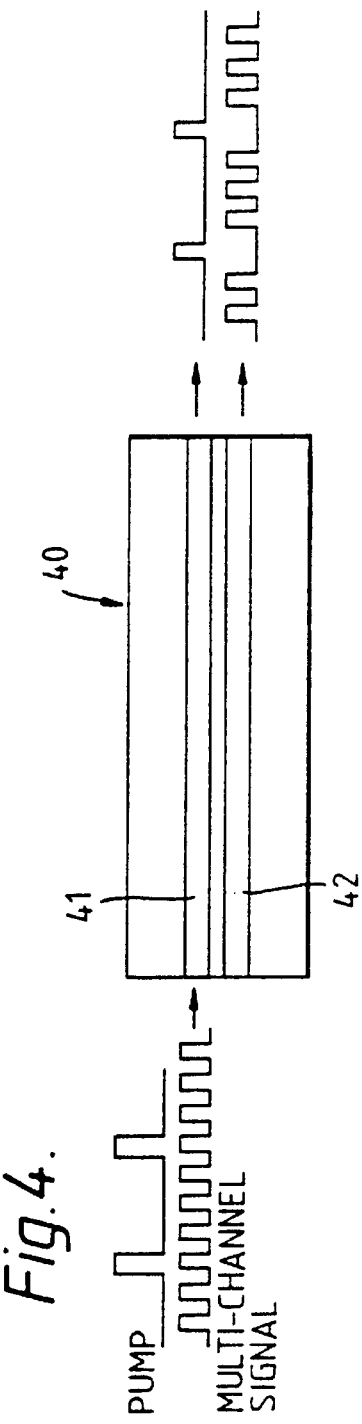
FIG. 4 shows a demultiplexer incorporating a directional coupler as shown in FIG. 3.

Referring to FIG. 4, alternatively a directional coupler 40 can be used to produce spatial switching from a change in refractive index. A directional coupler consists of two waveguides 41, 42 in close proximity such that the optical modes of the two guides 41, 42 are coupled. Light launched into one guide 41 periodically crosses to the other guide 42 and then returns as it propagates through the device. A device of appropriate length can thus give all output in the cross state. The effect of changing the refractive index of one of the guides 41 can be to inhibit the crossover and hence to leave light in the incident guide.

Non-linear grating devices can also be used to translate an index change into, for example, bistable behaviour or tunable wavelength filtering.

The suitability of this ultrafast refractive non-linearity for all-optical switching can be evaluated by considering a figure of merit for non-linear materials disclosed in "Two Photon Absorption as a Limit to All-optical Switching" published in Optics Letters volume 14 pages 1140–1142 (1989) by V Mizrahi et al. This makes clear some minimum material requirements for all-optical switching device applications, independent of the waveguide length and optical intensity;

$$|n_2/\beta\lambda|>c$$

where $\beta$ is the TPA coefficient $\lambda$ is the operating wavelength, and c is a constant dependent on the device structure (2 for a non-linear directional coupler and 1 for a Mach-Zehnder interferometer, for example).

The term "operating wavelength" is used herein to mean the wavelength of optical radiation used to control the non-linear effect in a device.

Assuming the dominant non-linear absorption in this device is two photon absorption (TPA) in the confinement layers, and following the work of Sheik-Bahae et al, published in "Dispersion of Bound Electronic Non-Linear Refraction in Solids" published in IEEE Journal of Quantum Electronics volume 27 pages 1296–1309 (1991), on bulk material, $\beta$ can be estimated to be ~40 cm GW$^{-1}$. This leads to a figure of merit of around 7 for the waveguide structure in this device, comfortably above the minimum requirement for a range of potential devices.

In fact the non-linear refraction in the waveguide is reduced from that of the well material by the optical confinement factor (0.04) so a value of $n_2=1\times10^{-9}$ cm$^2$W$^{-1}$ for TE polarised light in the well material may be deduced, assuming the non-linear refraction is dominated by the well material. Estimating a TPA value of 65 cmGW$^{-1}$, consistent with measured values of TPA in InGaAsP/InP MQW waveguides published in "Two-photon Absorption and Self-phase Modulation in InGaAsP/InP Multi-quantum-well Waveguides" in the Journal of Applied Physics vol 70 pages 3992–3994 by H K Tsang et al., implies a material figure of merit of about 100 for the well material. Optical confinement factors in practical devices will tend to reduce this value but there is clearly scope for optimising devices to exploit this highly attractive effect.

The arrangement described above with reference to FIGS. 1 and 2a–c represents a study of a large ultrafast optical non-linearity in active semiconductor waveguides. The results indicate that a compact all-optical switching device approaching terabit data rates and operating at practical power levels is achievable.

Referring to FIG. 1, the device used as the active waveguide 3, in more detail, comprises a 1 mm long four quantum well GRINSCH (graded index, separate confinement, heterostructure), buried heterostructure waveguide based on:

i. barriers of GaInAsP quaternary material of bandgap equivalent wavelength 1.29 $\mu$m.

ii. wells of GaInAs material (lattice matched to InP).

GaInAs has a bandgap equivalent wavelength of ~1.67 $\mu$m which is shortened by quantum size effects in a quantum well structure. In the present case the effect of this is to give a bandgap equivalent wavelength in the 1.5 $\mu$m region for the wells which make up the active material.

Details of a similar device (structurally) have been published in the paper "High Power 1.5 $\mu$m All-MOVPE Buried Heterostructure Graded Index Separate Confinement Multiple Quantum Well Lasers", published in Electronics Letters volume 25 pages 1635–1636 (1991) by D M Cooper, C P Seltzer, M Aylett, D J Elton, M Harlow, H Wickes and D L Murrell. However, the device disclosed in this reference is a laser whereas, in the device of FIG. 1, both end facets are anti-reflection coated.

Design issues for optimisation of high speed non-linear optical devices based on the effect described above will now be discussed in more detail.

The non-linear effect under consideration originates principally in the active region of the device concerned. A particular waveguide structure leads to a characteristic optical field distribution within the waveguide which will have an associated confinement factor in the active region. The refractive index change in the active material gives a change in the modal index of the guided light weighted by the confinement factor. The modal index change is the important parameter in a waveguide switch and so a high confinement factor will lead to lower operating powers.

The choice of active material is also important and, as pointed out above, it appears that a significant enhancement of the non-linearity occurs in quantum well material compared with bulk material. In bulk material, there is a further constraint in that the composition of the bulk active region is determined by the required operating wavelength of the device, and the thickness will then be constrained by the need to control the optical modes supported by the waveguide structure. The use of quantum well material in the active region of a waveguide allows some degree of independence in the choice of bandgap (and hence operating wavelength) and refractive index (and hence waveguiding properties). This independence is not available with bulk active material. For a given combination of well and barrier materials comprising the MQW, the bandgap is controlled by the thickness of the well material, whereas the refractive index is controlled by the ratio of well and barrier thickness so that these two parameters can be optimised independently. The extra flexibility offered in the design of waveguides could, in particular, give optical modes well matched to external optics (e.g. a circularly symmetric modes for coupling to lensed fibres). Thus higher coupling efficiencies are obtained and lower pump power can be used.

It has been found that there is a "trade-off" between achieving a significant non-linear effect and losses in the optical pump and/or signal. The cause of the losses is not yet determined but the extent tends to increase with the amount of active material through which the pump or signal passes. Another advantage which quantum well devices have is that background losses tend to be lower than in bulk devices. This has been found to be more particularly the case where longer wavelengths for the pump or signal are concerned, for instance 1.55 $\mu$m rather than 1.3 $\mu$m or 0.98 $\mu$m.

High optical intensities in the active region produce the refractive changes and so for optical power efficiency, a small modal area is required together with a high coupling efficiency from an external source. The optical confinement should also be sufficiently strong that the optical modes are negligibly perturbed by the changes in the refractive index profile induced by the optical intensities to be used.

Control over transverse modes in the waveguide is important to achieve good switching contrast and coupling efficiency in and out of the device. This means ensuring that only the modes required to achieve device operation are supported (e.g. a single mode vertically and two horizontally for a non-linear directional coupler). Satisfactory operation may still be obtainable, however, with slightly overmoded structures.

Internal losses need to be minimised. The current bias to transparency balances absorption due to interband transitions in the active region but the waveguides will still have residual loss due to scattering and defect related absorption as well as two photon absorption (TPA) in all layers of the waveguide and free carrier absorption particularly in the active region. Defect related processes can be reduced to low levels with high quality material and scattering can be minimised by careful waveguide design and fabrication. TPA can be kept low by keeping down optical intensity (again highlighting the need for high optical confinement to the active region and hence low peak switching powers), and free carrier absorption, although inevitable, can be minimised by suitable choice of operating wavelength (i.e. chosen to minimize the transparency current and hence the carrier density in the active region). Processes such as TPA which give rise to real changes in the carrier populations may be particularly significant as such changes will lead to long term (few hundred picoseconds) effects, potentially causing problems in the switching of high duty cycle pulse trains.

A further consideration in choosing the active material is that it appears that strained quantum well material causes a further enhancement of the non-linear refractive index at transparency of a laser amplifier. A 16 well zero net strain amplifier based on the laser reported by Seltzer, C. P, Perrin, S. D, Tatham, M. C, and Cooper, D. M, in "Zero-net-strain and conventionally strained InGaAsP/InP multiquantum well lasers" published in Electronic Letts., 1992, 28, pp. 63–63, has been assessed. This device had an active region consisting of compressively strained InGaAs wells between tensile strained InGaAsP ($\lambda$=1.3 $\mu$m) barriers. With unstrained devices it was found that the non-linear index varied with the optical confinement factor (the proportion of the optical intensity overlapping the gain medium). However, with this strained device, although the confinement factor was only 0.07, the non-linear index for the waveguide was two to three times greater than that for an unstrained device with a slightly greater confinement factor.

Consequently, the inclusion of strain in the active region of laser amplifiers may be advantageous for optimising devices for non-linear operation at transparency. An optimised device might include a large number of strained wells or wells with a shallower well/barrier energy level step to increase the confinement factor while maintaining the use of strained active material.

Referring to FIGS. 3a–3b, a specific ultrafast optical switching device is based on a non-linear directional coupler 20. This comprises two waveguides 21, 22 close enough together to allow optical coupling between modes propagating in the guides.

Referring to FIGS. 3a, in plan view, the directional coupler 20 simply comprises a device with a pair of parallel ridge waveguides 21, 22. Referring to FIG. 3b, the construction of these waveguides can be seen in cross section, being as follows:

(i) A substrate 23 of InP, ~100 $\mu$m thick, n-doped;
(ii) A buffer layer 24 of InP, 1.5 $\mu$m thick and doped to n=2×10$^{18}$;
(iii) An undoped active/waveguide layer 25, of MQW construction and total thickness 0.4 $\mu$m;
(iv) A cladding layer 26 of InP, 0.2 $\mu$m thick and p-doped to 5×10$^{17}$;
(v) An etch stop layer 27 of GaInAsP, 0.03 $\mu$m thick and p-doped to 5×10$^{17}$;
(vi) A ridge 28 of each waveguide 21, 22, comprising InP, 1.0 $\mu$m thick and p-doped to 5×10$^{17}$;
(vii) A semiconductor contact layer 29 to each ridge 28, of GaInAs, 0.1 $\mu$m thick and p-doped to 10$^{19}$;
(viii) An isolate layer 30 of silicon oxide;
(ix) A metal contact layer 31 of Ti/Au.

All doping levels are given in cm$^{-3}$.

These thicknesses and doping levels quoted are for illustrative purposes only as a range of different parameters can give similar device properties.

The two ridges 28 of equal width W are separated by a distance S, formed by etching through the ridge and contact layers 28, 29 to form channels. The etch stop layer 27 is used to control the etch depth if a selective chemical etching process is used.

The active/waveguide layer 25 consists of 3 2GaInAs wells, each 65 Å thick, together with 60 Å InP barrier layers.

The active/waveguide layer 25 may alternatively have a more complicated layer structure to separate its two functions and achieve higher confinement. The well thickness is chosen to give the desired operating wavelength, while the barrier thickness is chosen to be as thin as possible without leading to coupling between the carrier bound states in adjacent wells. The total MQW thickness is then chosen to give the desired waveguiding properties.

It should be noted that a different number of wells could be used in the active/waveguide layer 24, such as fewer wells. However, this would affect the coupling length ($L_o$) in the device and adjustments might be necessary in the active/waveguide layer thickness.

The insulating layer 30 is a silicon oxide insulating layer which is windowed above the ridges to allow an ohmic contact 31, typically either Ti/Au or Ti/Pt/Au, to be made to the tops of the waveguides 21, 22. Ohmic contact is also made to the bottom of the substrate 23 before cleaving the devices to the required length.

Low reflectivity coatings are required on cleaved facets of the device 20 to minimise any resonant cavity effects.

The structure described, and shown in FIG. 3, gives a vertical confinement factor of ~0.3 for the active material and single modal operation at 1.55 $\mu$m for the individual ridge waveguides 21, 22. At low powers, light launched into one of the guides 21 crosses to the other guide 22 in a distance $L_2$, the coupling length, and then back to the through state, continuing periodically. Coupling lengths for directional couplers of this type, where the ridges 28 have a width W of between 2 $\mu$m and 3 $\mu$m separated by a gap S of 2 $\mu$m to 3 $\mu$m, lie in the range 0.5–4 mm. If the waveguides 21, 22 are perturbed then the crossover can be inhibited and the light remains in the original guide 21.

Referring to FIG. 4, as mentioned above, a demultiplexer can be realised as follows: a high bit rate data stream, consisting of a number of optical TDM channels, passes through a directional coupler of length $L_2$ and emerges in the cross state. Applying a high power pulse as a "pump" at the data rate of a single channel and synchronised with the desired channel, inhibits crossover for that channel, which therefore emerges in the through state, spatially separated from the remainder of the bit stream which can also be recovered if required.

Figure 5:
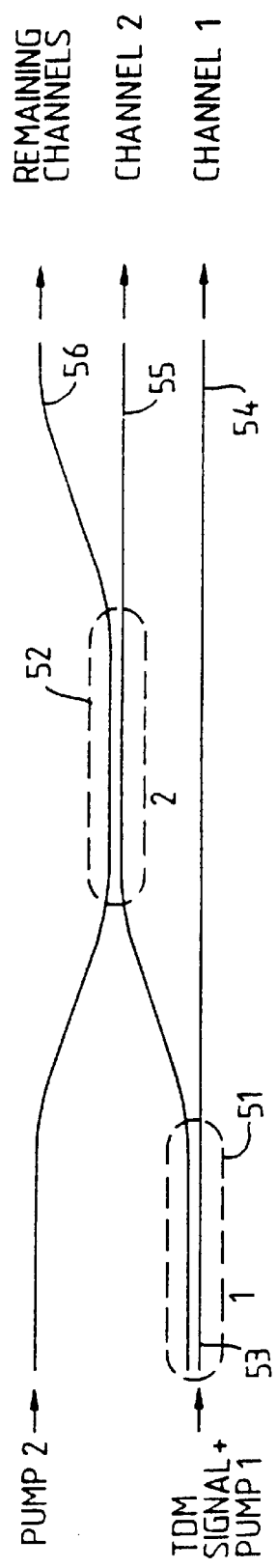
FIG. 5 shows an arrangement for demultiplexing two separate channels from a multi-channel, high bit rate, data stream, based on cascaded directional couplers.

Referring to FIG. 5, separation of the switched and unswitched channels might be done for instance by integration of curved waveguides to achieve a wider spatial separation (e.g. for optical fibre output), and suitable technology has already been developed to achieve this, disclosed in "Integrated Lossless 1 to 4 Optical Splitter/Combiner Operating at 1.55 μm" by D A O Davies, P S Mudhar, M A Fisher, D A H Mace, M J Adams, presented as a post-deadline paper (PD10) at the Topical Meeting on Optical Amplifiers and Applications, Santa Fe, New Mexico, Jun. 24–26 1992.

In FIG. 5, two directional couplers 51, 52 are cascaded. There is an input 53 carrying multiple channels of a high data rate link, and three outputs 54, 55, 56. The multiple channels would cross over at each directional coupler 51, 52 so as to leave the arrangement on the output 56 furthest spatially (as shown) from the input 53. However, pumps are used to inhibit crossover at each coupler 51, 52 for a single channel. Thus a single channel is output on each remaining (and spatially separated) output 54, 55.

The pump and data must be separated to recover the data at an output and there are a number of approaches that can be used to achieve this. Codirectional pump and data may have crossed polarisations or be at different wavelengths, allowing separation using a polariser or filter respectively. In either case, "walk-off" of the pulses due to dispersion and different coupling behaviour needs to be considered. These effects can be minimised by suitable waveguide design.

Alternatively, contradirectional pump and data could be used. Here separation at the signal output is not required but the pump pulses need to be longer than the data pulses, possibly as long as the data pulse transit time in the device 20, to achieve good overlap in the device 20. The ability to use the device in pipeline mode (with more than one pulse in the device at a time) would then be lost, limiting the multiplexed channel spacing to the device transit time. This is around 10 ps for a 1 mm long device. This may be acceptable for some applications.

It will be realised that embodiments of the present invention can provide functional switching, processing or logic devices based on non-linear active waveguides at transparency. The benefits of this approach include not only low optical power requirements, but also compactness, the use of a mature device processing technology and a clear potential for integration with other components. Applications could include the non-linear directional coupler and Mac-Zehnder interferometer referred to above, a Fabry-Perot etalon, and grating structures etc. biased at transparency.

Figure 6A:
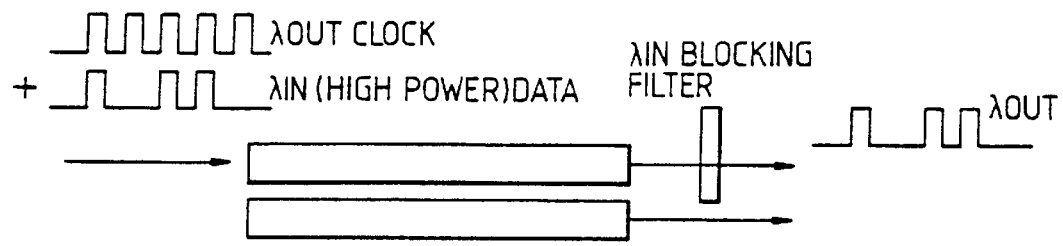
FIGS. 6a and 6b show two configurations of a wavelength converter incorporating a directional coupler as shown in FIG. 3.
Figure 6B:
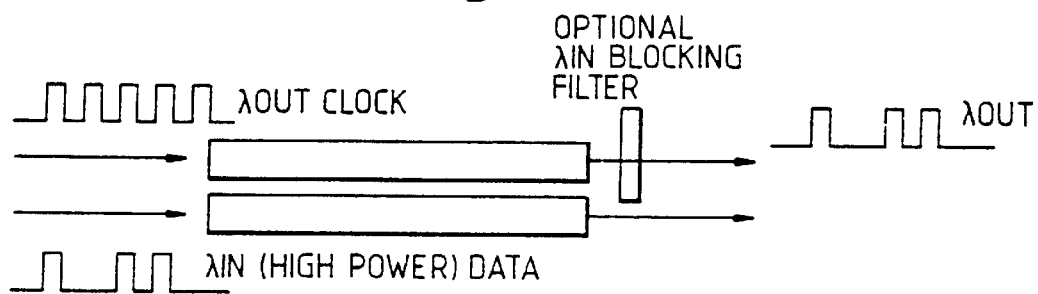

For example, a similar directional coupler to that shown in FIGS. 3a–3b can be designed to operate as a wavelength conversion device at very high bit rates. To achieve this a directional coupler, composed of two parallel amplifiers in close proximity and with a common current contact, is designed to be of length one coupling length over the target wavelength range of interest. FIGS. 6a–6b show two configurations of such a wavelength converter, FIG. 6(a) shows an arrangement having two optical inputs at one input port, the first being the data signal, and the second a clock signal (synchronised with the data signal) at the target wavelength. The wavelength of the clock may lie anywhere within the gain spectrum of the amplifier, or over a range of wavelengths below or above this spectrum. The data signal peak pulse powers must be sufficient to access the fast non-linearity at transparency, whilst the clock powers may be much lower than this. When the clock and signal pulses coincide, the information will be transferred from the signal wavelength to the clock wavelength and, at the same time, the resulting information pulse will be emitted from the appropriate exit port of the device. When this coincidence does not occur, the clock pulses will be emitted from the other exit port. The device thus performs the dual function of wavelength conversion and separation of clock and information outputs. A filter would be required, for the configuration shown in FIG. 6(a), at the output to exclude wavelengths other than that of the converted data. For a low-loss (high extinction) device, the requirement for this filter can be relaxed, or for an ideal device dispensed with, by arranging the clock and signal inputs to be incident at different input ports; in this case the initial and converted data are emitted from different exit ports as shown in FIG. 6(b).

Figure 7:
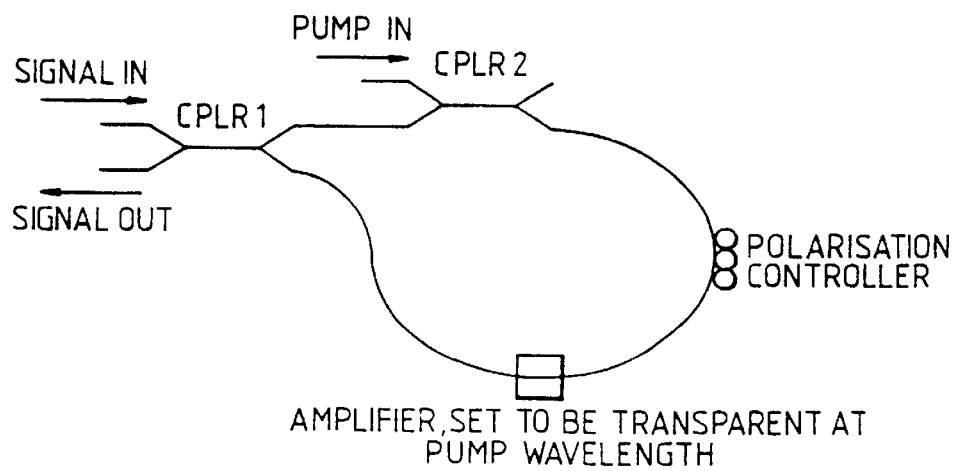
FIG. 7 shows a non-linear loop mirror incorporating a laser amplifier set at transparency according to the present invention.

A further example of a device according to the present invention comprises a laser amplifiers based at transparency in a non-linear loop mirror (see FIG. 7). In this device, the input (signal) pulse is split in half by coupler CPLR 1, with the half pulses counter-propagating around the loop. In the absence of a pump pulse the signal recombines at CPLR 1 and no signal emerges from the output port. A strong pump pulse (at the transparency wavelength for the amplifier bias in use) is introduced through the wavelength division multiplexing coupler CPLR 2, and propagates round the loop, temporally and spatially overlapping the half of the signal pulse propagating in the same direction. The phase shift introduced in the signal beam co-propagating with the pump relative to the counter propagating beam will induce switching when the beams return to the coupler CPLR 1 and interfere, leading to a non-zero signal at the output.

Applications of such a device could include demultiplexing, as well as more general switching in time division multiplexed systems, optical logic operations and, since the pump and probe will be at different wavelengths, wavelength conversion. As for the wavelength converter comprising a directional coupler, the data signal will need to be at a high power and would, in this example, be launched into CPLR2, and the clock signal need not be at powers high enough to access the non-linearity and, in this example, would be launched into CPLR1. The wavelength converted data signal would then emerge from CPLR1.

This arrangement is an improvement over known fibre non-linearity based loop mirrors because the transit time will be much reduced (a fibre loop mirror can be 10 km long), and group velocity dispersion will be much less important, again because the device length will be orders of magnitude less.

The arrangement is also an improvement to previously published devices where the amplifier is not biased at transparency, and switching is achieved using long lived inter-band transitions, for example O'Neill, A. W. and Webb, R. P., "All-optical loop mirror switch employing an asymmetric amplifier/attenuator combination", Electronics Lett., 1990, 24, pp. 2008–2009, and Eiselt, M., "Optical loop mirror with semiconductor laser amplifier", Electronics Letts., 1992, 28, pp. 1505–1507. Although some devices using the long lived effect such as the SLALOM device (semiconductor laser amplifier in a loop mirror) described by Eiselt can achieve switching of data from multi gigabit data streams, the relatively long carrier recombination times will cause patterning unless the pump pulse repetition rate is kept to below about 1 GHz. In contrast, the device according to the present invention can respond quasi-instantaneously to pump signals at data rates up to the order of 100 Gbit/s, without patterning effects, allowing significantly more flexibility in the application of the device when compared to those already demonstrated.

Yet a further example of a device according to the present invention comprises an all-optical clock recovery device utilising a laser amplifier biased at transparency. The all-optical recovery of a clock signal from a data stream using a mode locked laser is known from a paper by Smith & Lucek, published in Electronics Letts., Vol 28, No. 19, pp. 1814–15, 1992. Here a data stream was used to mode lock a fibre laser via a non-linear optical modulator which was shared between the laser cavity and the transmission fibre. The non-linear optical modulator comprised a 9 km length of optical fibre in which the mode locking was achieved by cross phase modulation of the laser light by the data stream. According to the present invention the length of fibre is replaced by a semiconductor optical amplifier biased at transparency which acts as the non-linear optical modulator. The advantages of this device is terms of reduced size and temperature sensitivity are clear, however most importantly, because several passes of the cavity are required in order to achieve mode locking, the reduction in the cavity length results in greatly reduced delay times before locking occurs.

It is not essential that an embodiment of the present invention has a waveguiding region. Although a waveguiding region might be used to give a long enough interaction path for a significant effect to be achieved by use of the optical pump, alternative structures might for instance incorporate a resonator arrangement, in which radiation travels to and fro, in order to achieve a suitable length of interaction path. Hence, embodiments of the present invention might comprise a Fabry-Perot or Confocal arrangement in place of waveguiding.

In logic devices, there will be one or more signal (data) inputs. One or more of these might act as the optical pump, there being no need for a separate optical pump input. The effect of all inputs to the device would be to provide one or more optical outputs whose level is related to, that is determined by, the levels of the inputs. Functions covered in this way could include:

thresholding: single input beam produces a high output only when the input level exceeds a critical value;

limiting: output level constrained to be less than some set value, regardless of input;

binary (or higher) logic operations: multiple inputs giving outputs determined by the relationships between signals on different data channels;

bistability: recent history of input signals plays a part in determining the outputs.

In the above description of specific embodiments of the present invention, the InP materials system is employed. This and the AlGaAs/GaAs materials system are currently the most developed for opto-electronic devices and it is advantageous that the invention could be carried out in either system. However, it is thought to be the case that the non-linearity at transparency on which the invention is based could be observed in any direct bandgap semi-conductor material.

I claim:

1. A method of extracting a clock signal from an optical data stream, the method comprising:

mode locking an optical fibre laser with the data stream to produce a stream of laser pulses at the clock frequency, the optical fibre laser including a resonant cavity within which is locked a non-linear optical modulator including a semiconductor optical amplifier which is biased at transparency.

2. A method as in claim 1 wherein the data stream is an optical time division multiplexed data signal.

3. A method as in claim 2 wherein the data stream has a data rate of at least 100 Gbit/s.

4. A clock extraction device for extracting a clock signal from an optical data stream, the device comprising:

an optical fibre laser having a resonant cavity which incorporates a non-linear optical modulator, input means to permit, in use, the optical data stream to be coupled into the resonant cavity for passage through the optical modulator;

the arrangements being such that the laser can, in use, be mode-locked by the data stream, and output means to permit pulses produced by the mode-locked laser to be coupled out from the cavity;

wherein the non-linear optical modulator is a semiconductor optical amplifier which is, in use, biased at transparency.

5. A device as in claim 4 which is configured to extract a clock signal of at least 10 GHz.

6. A device as in claim 5, wherein the semiconductor optical amplifier has an active layer comprising a multiple quantum well material.

7. A device as in claim 6, wherein the optical amplifier is configured for operation with optical wavelengths in the region of 1.5 to 1.55 $\mu$m.

8. An all-optical clock recovery device comprising:

an optical laser incorporating a semi-conductor optical amplifier biased at transparency within an optically resonant cavity;

an optical input port to mode lock said optically resonant cavity with an optical data stream input therethrough; and an optical output port to output optical mode-locked output pulses from said optical cavity.

9. An all-optical clock recovery method comprising:

using an input optical data stream to mode lock an optical laser incorporating a semi-conductor optical amplifier biased at transparency with an optically resonant cavity; and outputting mode-locked optical pulses from said cavity.

10. A method of extracting a clock signal from an optical data stream, the method comprising:

mode locking an optical fibre laser with the data stream to produce a stream of laser pulses at the clock frequency, the optical fibre laser including a resonant cavity within which is located a non-linear optical modulator including a semiconductor optical amplifier which is biased at transparency for the radiation of the optical data stream having a wavelength shorter than a bandgap equivalent wavelength of an active amplifier region.

11. A method as in claim 10 wherein the data stream is an optical time division multiplexed data signal.

12. A method as in claim 11 wherein the data stream has a data rate of at least 100 Gbit/s.

13. A clock extraction device for extracting a clock signal from an optical data stream, the device comprising:

an optical fibre laser having a resonant cavity which incorporates a non-linear optical modulator, input means to permit, in use, the optical data stream to be coupled into the resonant cavity for passage through the optical modulator;

the arrangements being such that the laser can, in use, be mode-locked by the data stream, and output means to permit pulses produced by the mode-locked laser to be coupled out from the cavity;

wherein the non-linear optical modulator is a semiconductor optical amplifier which is, in use, biased at transparency for the radiation of the optical data stream having a wavelength shorter than a bandgap equivalent wavelength of an active amplifier region.

14. A device as in claim 13 which is configured to extract a clock signal of at least 10 GHz.

15. A device as in claim 14, wherein the semiconductor optical amplifier has an active layer comprising a multiple quantum well material.

16. A device as in claim 15, wherein the optical amplifier is configured for operation with optical wavelengths in the region of 1.5 to 1.55 $\mu$m.

17. An all-optical clock recovery device comprising:

an optical laser incorporating a semi-conductor optical amplifier biased at transparency within an optically resonant cavity;

an optical input port to mode lock said optically resonant cavity with an optical data stream input therethrough; and an optical output port to output optical mode-locked output pulses from said optical cavity wherein the radiation of the optical data stream has a wavelength shorter than a bandgap equivalent wavelength of an active amplifier region.

18. An all-optical clock recovery method comprising:

using an input optical data stream to mode lock an optical laser incorporating a semi-conductor optical amplifier biased at transparency within an optically resonant cavity; and outputting mode-locked optical pulses from said cavity;

wherein the radiation of the optical data stream has a wavelength shorter than a bandgap equivalent wavelength of an active amplifier region.

* * * * *